US011182092B1

(12) United States Patent
Tsirkin et al.

(10) Patent No.: US 11,182,092 B1
(45) Date of Patent: Nov. 23, 2021

(54) PRI OVERHEAD REDUCTION FOR VIRTUAL MACHINE MIGRATION

(71) Applicant: Red Hat, Inc., Raleigh, NC (US)

(72) Inventors: Michael Tsirkin, Westford, MA (US); Amnon Ilan, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/928,284

(22) Filed: Jul. 14, 2020

(51) Int. Cl.
*G06F 12/00* (2006.01)
*G06F 3/06* (2006.01)
*G06F 9/455* (2018.01)
*G06F 12/02* (2006.01)

(52) U.S. Cl.
CPC .......... *G06F 3/0647* (2013.01); *G06F 3/0619* (2013.01); *G06F 3/0664* (2013.01); *G06F 3/0673* (2013.01); *G06F 9/45558* (2013.01); *G06F 12/0223* (2013.01); *G06F 2009/4557* (2013.01); *G06F 2009/45583* (2013.01); *G06F 2212/152* (2013.01)

(58) Field of Classification Search
CPC .. G06F 3/0647; G06F 9/45558; G06F 3/0619; G06F 3/0673; G06F 3/0664; G06F 12/0223; G06F 2009/45583; G06F 2009/4557; G06F 2212/152
See application file for complete search history.

(56) References Cited

U.S. PATENT DOCUMENTS

| 8,024,496 | B2 * | 9/2011 | Arndt ...................... G06F 13/28 710/22 |
| 8,171,230 | B2 | 5/2012 | Freimuth et al. |
| 8,719,464 | B2 | 5/2014 | Kegel et al. |
| 9,348,655 | B1 * | 5/2016 | Tsirkin .................. G06F 9/5016 |
| 9,679,143 | B2 | 6/2017 | Desai |
| 10,719,463 | B1 * | 7/2020 | Bshara ..................... G06F 3/061 |
| 2015/0199126 | A1 * | 7/2015 | Jayasena ............. G06F 12/0811 711/103 |
| 2019/0114283 | A1 | 4/2019 | Deval et al. |

(Continued)

OTHER PUBLICATIONS

John Fisher-Ogden; "Hardware Support for Efficient Virtualization"; University of California, San Diego; Duke University; Accessed Date: May 29, 2020; 12 Pages.

(Continued)

*Primary Examiner* — John A Lane
(74) *Attorney, Agent, or Firm* — K&L Gates LLP

(57) ABSTRACT

The present disclosure provides a new and innovative system, methods and apparatus for PRI overhead reduction for virtual machine migration. In an example, a system includes a memory and a hypervisor. The memory includes a plurality of memory addresses on a source host. The hypervisor is configured to generate a migration page table associated with the memory. The hypervisor is also configured to receive a migration command to copy data from a portion of the memory to a destination host. A first range of memory addresses includes data copied from the portion of the memory and a second range of memory addresses includes data that is not copied. The hypervisor is also configured to modify the migration page table to include a page table entry associated with the first range of memory addresses being migrated from the source host to the destination host.

20 Claims, 6 Drawing Sheets

(56) References Cited

U.S. PATENT DOCUMENTS

2019/0146825 A1* 5/2019 Dang .................... G06F 13/105
718/1
2019/0205220 A1* 7/2019 Zhang ................... G06F 11/073

OTHER PUBLICATIONS

Edwin Zhai, Gregory D. Cummings, and Yaozu Dong; "Live Migration with Pass-Through Device for Linux VM"; Intel Corp.; Jul. 23-26, 2008; Ottawa, Ontario, Canada; 2008 Linux Symposium, vol. Two; pp. 261-267-10 Pages.

Xin Xu, Bhavesh Davda; "SRVM: Hypervisor Support for Live Migration with Passthrough SR-IOV Network Devices"; VMware Inc; Apr 2-3, 2016; pp. 65-77-13 Pages.

* cited by examiner

PRI OVERHEAD REDUCTION FOR VIRTUAL MACHINE MIGRATION

BACKGROUND

The present disclosure generally relates to virtual migration in computer systems. Virtual Machines (VMs) typically migrate data in memory locations between hypervisors of the respective VMs. In some instances, live migration may be used to allow moving VMs between hypervisors with minimal downtime. Generally, live migration refers to the process of moving a running VM or application between different physical machines without disconnecting the client or application. Memory, storage, and network connectivity of the virtual machine are transferred from the original guest machine (e.g., source host) to the destination (e.g., destination host). A key feature of live migration is memory change tracking: each memory page changed by the VM on a source host is copied to a destination host (e.g., memory location). This allows the VM on the source host to keep running while the memory is being set up and migrated to destination host. During memory migration, the hypervisor typically copies all the memory pages from source to destination while the VM is still running on the source. If some memory pages change during this process, they will be re-copied.

SUMMARY

The present disclosure provides a new and innovative system, methods and apparatus for PRI overhead reduction for virtual machine migration. In an example, a system includes a memory and a hypervisor. The memory includes a plurality of memory addresses on a source host. The hypervisor is configured to execute on one or more processors. The hypervisor is configured to generate a migration page table associated with the memory. The hypervisor is also configured to receive a migration command to copy data from a portion of the memory to a destination host. A first range of memory addresses includes data copied from the portion of the memory and a second range of memory addresses includes data that is not copied. The hypervisor is also configured to modify the migration page table to include a page table entry associated with the first range of memory addresses being migrated from the source host to the destination host. The write access to a memory address in the first range of memory addresses by a device during migration is tracked.

In an example, a method includes generating, by a hypervisor, a migration page table associated with a memory. The memory includes a plurality of memory addresses on a source host. The method also includes receiving, by the hypervisor, a migration command to copy data from a portion of the memory to a destination host. A first range of memory addresses includes the data copied from the portion of the memory, and a second range of memory addresses includes data not copied. The method also includes modifying, by the hypervisor, the migration page table to include a page table entry associated with the first range of memory addresses being migrated from the source host to the destination host. Write access to a memory address in the first range of memory addresses by a device during migration is tracked.

In an example, a non-transitory machine-readable medium storing code, which when executed by a processor is configured to generate a migration page table associated with memory. The memory includes a plurality of memory addresses on a source host. The non-transitory machine-readable medium is also configured to receive a migration command to copy data from a portion of the memory to a destination host. A first range of memory addresses includes the data copied from the portion of the memory, and a second range of memory addresses includes data not copied. The non-transitory machine-readable medium is also configured to modify the migration page table to include a page table entry associated with the first range of memory addresses being migrated from the source host to the destination host. Write access to a memory address in the first range of memory addresses by a device during migration is tracked.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
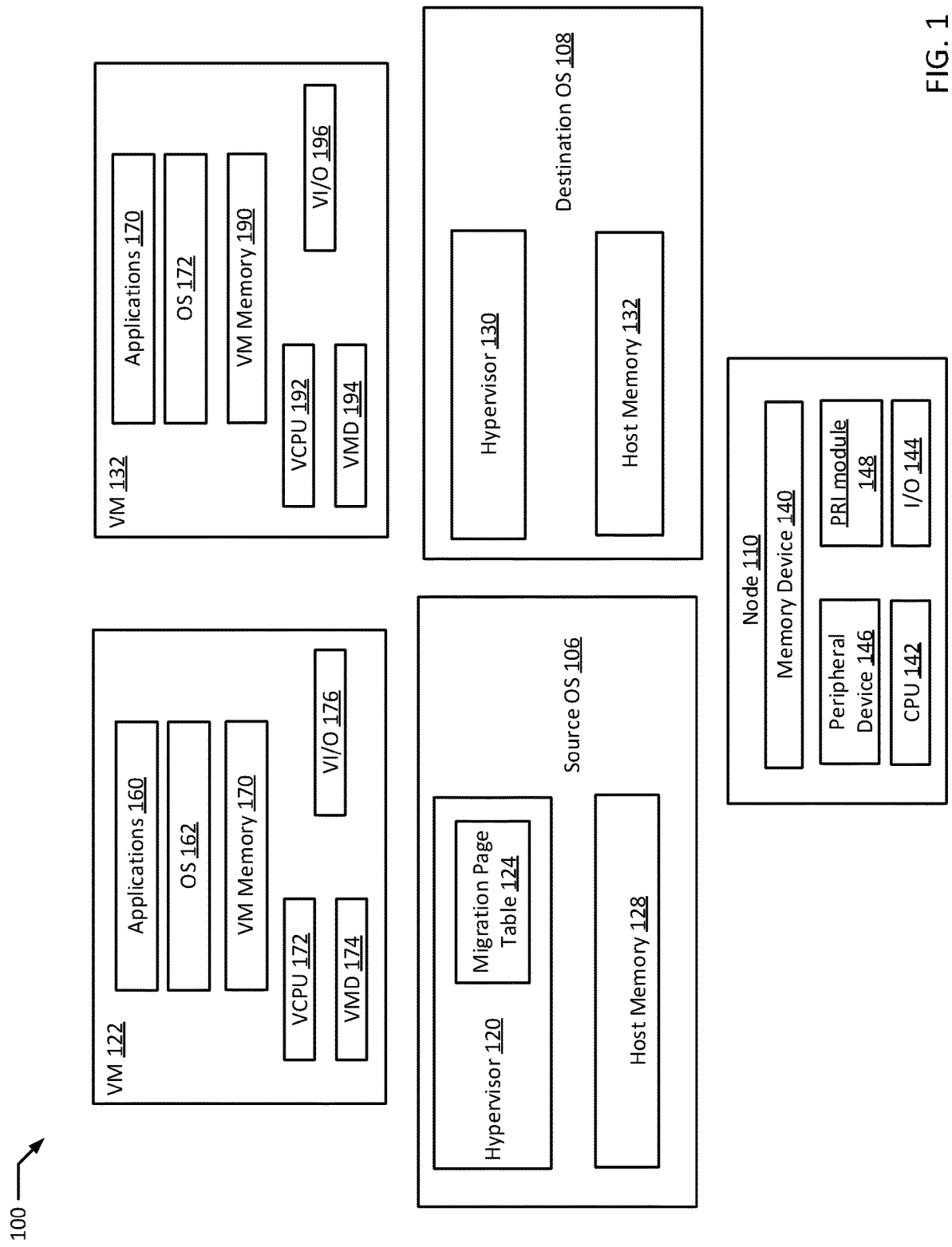
FIG. 1 is a block diagram of a PRI overhead reduction system according to an example of the present disclosure.

In many computer systems, physical hardware may host isolated guests such as virtual machines and/or containers. In an example, the VM may be a robust simulation of an actual physical computer system utilizing a hypervisor to allocate physical resources to the virtual machine. In some examples, a container-based virtualization system such as Red Hat® OpenShift® or Docker® may be advantageous, as container-based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In sharing physical computing resources, isolated guests and/or a hypervisor controlling them, may also have access to shared components of the underlying physical host.

In typical computer systems, a VM may migrate data in memory locations between hypervisors of the respective VMs through live migrations. Typically, live migration involved moving a running VM or application between different physical machines without disconnecting the client or application, such that memory, storage, and network connectivity of the virtual machine are transferred from the original guest machine (e.g., source host) to the destination (e.g., destination host).

An issue with live migration, and similar memory migration/copy procedures, arises in conjunction with pass-through devices (e.g., virtual devices that are under guest control) that have direct memory access (DMA). Without any additional flags or information about how to manage pages mapped to an input/output (I/O) device, a host would need to conservatively be configured such that if an I/O device can write to a page, the I/O device has written to the page. In other words, to maintain data integrity between the source host and destination host, an access attempt by an I/O device without additional information/flags would be identified as read/write access by the I/O device and the memory accessed would be copied again, to maintain data integrity. Accordingly, I/O writable pages need to be constantly copied to a destination host to ensure the memory on the source host matches the memory at the destination host. The necessity under current systems to recopy all or most I/O writable pages breaks memory tracking and/or makes it inefficient for migrating large amounts of memory under I/O devices.

In current systems, peripheral component interconnect express (PCIe) systems use an address translation services (ATS) that implement a page request interface (PRI) or similar feature. Generally, PCIe is an interface standard for connecting high-speed components. The computer system may use a translation agent to translate addresses from a virtual address provided by the input/output (I/O) device to a physical address in system memory. In current systems, each time a device accesses a page, the device sends a page request message (PRM) to the host (e.g. source host) using the PRI. The requesting device sends a non-writable (NW) flag if the device is requiring read only access. When the flag is set on the incoming PRM, the source host identifies (e.g., interprets, flags, determines, etc.) that the data in memory accessed by the device is read only, and does not need to be re-copied to the destination host. If the flag is not set on the incoming PRM, the source host identifies that the data in memory accessed by the device is writable access, and the source host re-copies the accessed data to the destination host.

Accesses requests by the device are cached such that a PRM is not re-sent with each read/write request from the device over a given time period. However, on non-local workloads, a PRM is required to be sent when a device is accessing a page in current systems. Accordingly, those situations add a problematic overhead of at least 16 bytes per request and 16 bytes per response per each 4K page of memory, resulting in an overhead of 0.78%, or more (e.g., (16 byte request+16 byte response)/4096 byte page=0.78%).

The present disclosure reduces problematic PRI overhead through a modification of the source host to send a range or list of memory pages that are being migrated to the destination host. Typical PRI implementations can incur decreased or slowed performance on VMs during migration as the additional bytes in PRM requests from accessing devices increase latency and/or slowed performance. Additionally, current systems have tried to alleviate the overhead by implementing memory tracking by a driver, thereby removing the need for PRI. However, in those instances, memory tracking by driver has been proven to have even higher overhead than PRI, for example, an overhead increase by an order of 10%.

Instead of removing PRM or requiring PRM requests for all instance of a device accessing a page on the VM, the PRI overhead reduction for virtual machines system reduces latency on the VM being used by the user by eliminating the need for PRM requests—and the at least 16 bytes request+16 response per each 4K page of memory required—for devices accessing memory pages outside of the range being migrated between VMs. For example, by compiling and/or sending a migration page table or similar list of migration memory pages, a device accessing a page outside the range or list of memory pages that are being migrated to the destination host can bypass sending a PRM. Further, the migration page table will be null or empty when migration is not in progress, thereby allowing memory access by the device without any PRI overhead. The PRI overhead reduction system improves throughput for pci express limited flows by about 1%. For example, in instances of migrating 10-100 gigabits per second a migration over the course of a two-minute time period would see a performance increase between 0.5% and 1%. In systems where a networking device is accessing a page, the PRI overhead reduction system may provide a greater performance increase as networking instances have smaller packet sizes. Accordingly, the PRI overhead reduction system provides less latency of the VM during the live migration as the decrease in the instances of PRMs being sent through PRI needed removes the bytes needed for each request and corresponding response being transmitted over the smaller packets. The PRI overhead reduction system can provide increased storage device integrity as accessing memory pages outside of the range being migrated between VMs may have read and write access. Accordingly, the PRI overhead reduction system reduces latency on the VM being used by the user throughout the live migration process compared to typical PRI implementations.

Vendors using hypervisor (e.g., Kernel-based Virtual Machine (KVM)) on an operating system, such as Red Hat® Enterprise Linux® (REHL) may utilize the system and methods disclosed herein for communication and memory migration between virtual machines and the hypervisor. When handling network traffic and communication across security boundaries, hypervisor vendors and operating system (OS) vendors often attempt to improve performance, throughput, and latency. By compiling and/or sending a migration page table or similar list of migration memory pages, such that a device accessing a page outside the range or list of memory pages that are being migrated to the destination host can bypass sending a PRM, the PRI overhead reduction for virtual machines system reduces byte overhead of PRM requests/responses and performance may be improved.

As used herein the term "page" or "memory page" refers to a page, memory page, or virtual page that is a fixed-length contiguous block of virtual memory, described by a single entry in the page table. The page is the smallest unit of data for memory management in a virtual memory operating system. Similarly, a page frame is the smallest fixed-length contiguous block of physical memory into which memory pages are mapped by the operating system. In an example, memory paging is implemented to track the virtual addresses of the data of executing applications.

FIG. 1 depicts a high-level component diagram of an example PRI overhead reduction for virtual machines computing system 100 in accordance with one or more aspects of the present disclosure. The computing system 100 may include an operating system (e.g., source OS 106, destination OS 108), one or more virtual machines (e.g., VM 122, 132), and a node 110.

Each of the Virtual Machine (VM 122, VM 132) may include an OS, VM memory, a virtual CPU (VCPU), virtual memory devices (VIVID), and virtual input/output devices (VI/O). In an example, applications (e.g., application 160, 170) running on a virtual machine may be dependent on the underlying hardware and/or OS. For example, the VM 122 includes an OS 162, guest memory or virtual machine memory 170, a virtual CPU 172, a virtual memory device(s) 174, virtual input/output device 176, and applications 160. Virtual machine memory 174 may include one or more memory pages. Similarly, the VM 132 includes an OS 172, guest memory or virtual machine memory 190, a virtual CPU 192, a virtual memory device(s) 194, virtual input/output device 196, and application 170. Virtual machine memory 194 may include one or more memory pages.

The computing system 100 may also include a source OS 106 (e.g., source host) and a destination OS 108 (e.g., a destination host). The source OS 106 includes host memory 128 and a hypervisor 120. The hypervisor 120 may manage host memory 128 for the host operating system 106 as well as memory allocated to the virtual machines 122, 132 and guest operating system 162, 172 such as guest memory or virtual machine memory 170, 190 provided to guest OS 162, 172. The host memory 128 and virtual machine memory 170, 190 may be divided into a plurality of memory pages that are managed by the hypervisor 120. Virtual machine memory 170, 190 allocated to the VM OS 162, 172 may be mapped from host memory 128 such that when a guest application 160, 170 uses or accesses a memory page of virtual machine memory 170, 190, the guest application 160, 170 is actually using or accessing host memory 128.

The hypervisor 120 may include a memory manager or similar component configured to manage the generation, compilation, transmission, and other aspects of a migration page table 124 for PRI overhead reduction, as described herein. In those examples, a memory manager may execute independently, as part of source OS 106, as part of hypervisor 120, or within a virtualized guest. In another example, memory manager may be a component interface between a CPU 142 and memory device 140, managing access to memory device 114 by a physical device or node 110, VM 122, 132 and/or destination OS 108 (e.g., through hypervisor 120).

The destination OS 108 includes host memory 132 and a hypervisor 130. The hypervisor 130 may manage host memory 132 for the destination operating system 108 as well as memory allocated to the virtual machines 122, 132 and guest operating system 162, 172 such as guest memory or virtual machine memory 170, 190 provided to guest OS 162, 172. The host memory 132 and virtual machine memory 170, 190 may be divided into a plurality of memory pages that are managed by the hypervisor 130. Virtual machine memory 170, 190 allocated to the VM OS 162, 172 may be mapped from host memory 128 such that when a guest application 160, 170 uses or accesses a memory page of virtual machine memory 170, 190, the guest application 160, 170 is actually using or accessing host memory 132.

During a live migration, the hypervisor 120 of the source OS 106 may facilitate the copying of data from the host memory 128 to the host memory 132 on the destination OS 108. The hypervisor 130 of the destination OS 108 and the hypervisor 120 of the source OS 106 may be in communication to facilitate the migration and to allow for the VM 122, 132 on the source OS 106 to keep running while the memory is being set up and migrated to destination OS 108.

The computer system 100 may include one or more nodes 110. Each node 110 may in turn include one or more physical processors (e.g., CPU 142) communicatively coupled to memory devices 140 and input/output devices (e.g., I/O 144). Local connections within each node, including the connections between a CPU 120 and a memory device 140, may be provided by one or more local buses of suitable architecture, for example, peripheral component interconnect (PCI) or peripheral device 146. The node 110 may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 122, 132 may be provisioned on the same host or node (e.g., node 110) or different nodes. For example, VM 122 and VM 132 may both be provisioned on node 110. Alternatively, VM 122 may be provided on node 110 while VM 132 is provisioned on a different node.

As used herein, physical processor, processor, or central processing unit (CPU). 120 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a CPU.

As discussed herein, a memory device 140 refers to a volatile or non-volatile memory device, such as RAM, ROM, EEPROM, or any other device capable of storing data. As discussed herein, I/O device 144 refers to a device capable of providing an interface between one or more processor pins and an external device capable of inputting and/or outputting binary data.

CPU 120 may be interconnected using a variety of techniques, ranging from a point-to-point processor interconnect, to a system area network, such as an Ethernet-based network. Local connections within each node, may be provided by one or more local buses of suitable architecture, for example, peripheral component interconnect (PCI) or peripheral device 146.

A PRI module 148 may be communicatively coupled to the peripheral device 146 and/or CPU 142, memory device (s) 140, and I/O device(s) 144. In the PRI overhead reduction computing system 100, the PRI module 148 may be configured to access, check, reference, etc., the migration page table 124 to determine if each page to be accessed is within the range of memory being migrated from the source OS 106 to the destination OS 108. If a page to be accessed is outside of the range of memory being migrated, the PRI module 148 bypasses a PRM or similar communication with the source OS 106. An example is illustrated below in FIG. 2. If a page to be accessed is within the range of memory being migrated, the PRI module 148 sends a PRM to the hypervisor 120 and/or source OS 106. An example is illustrated below in FIG. 3. In an example, the requesting device sends a non-writable (NW) flag if the device is requiring read only access. If the flag is not set on the incoming PRM, the source OS 106 identifies that the data in memory accessed by the device is writable access, and the source OS 106 re-copies the accessed data to the destination OS 108.

Figure 2:
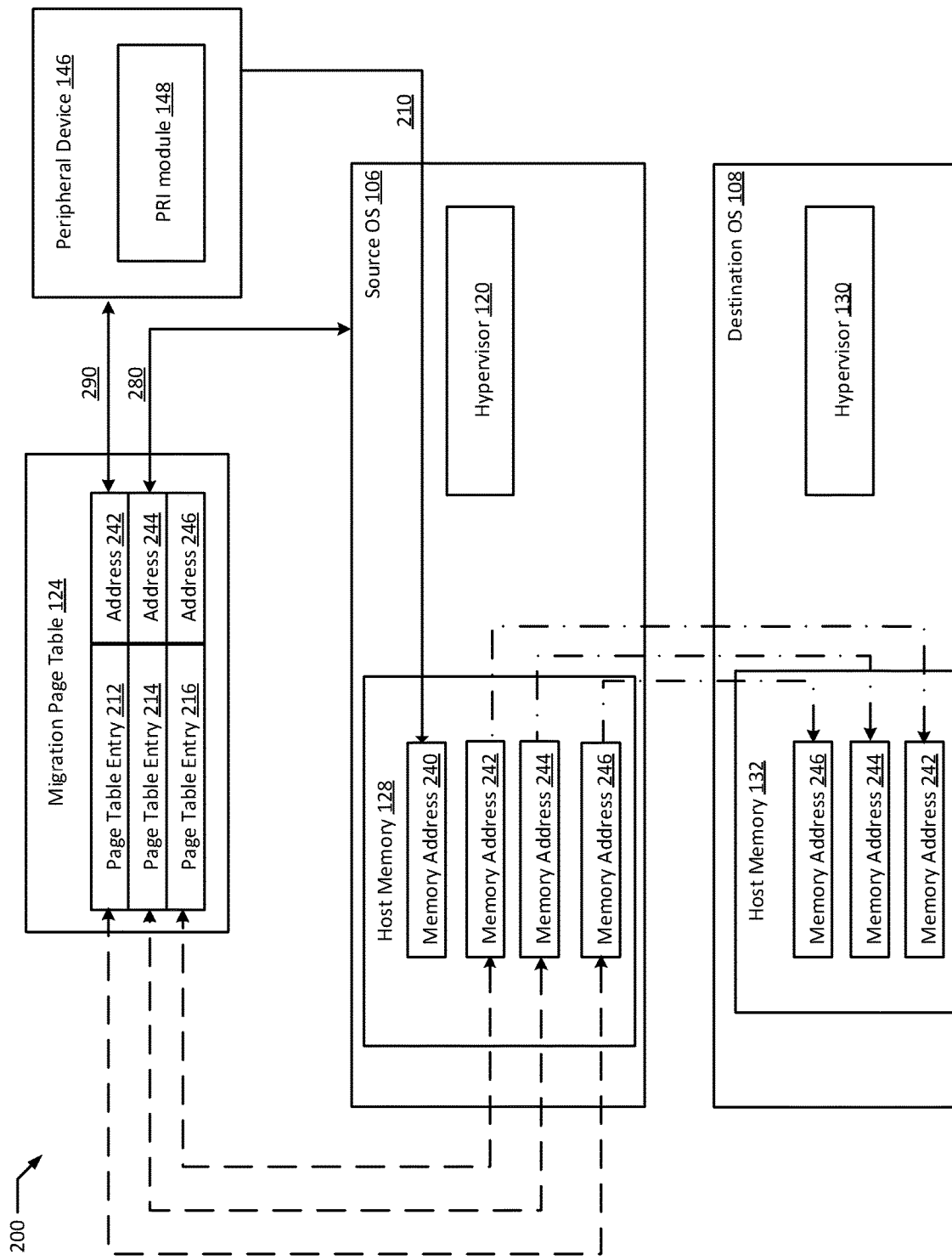
FIG. 2 is a flow block diagram illustrating accessing a page outside of a migration memory range in a PRI overhead reduction system according to an example of the present disclosure.
Figure 3:
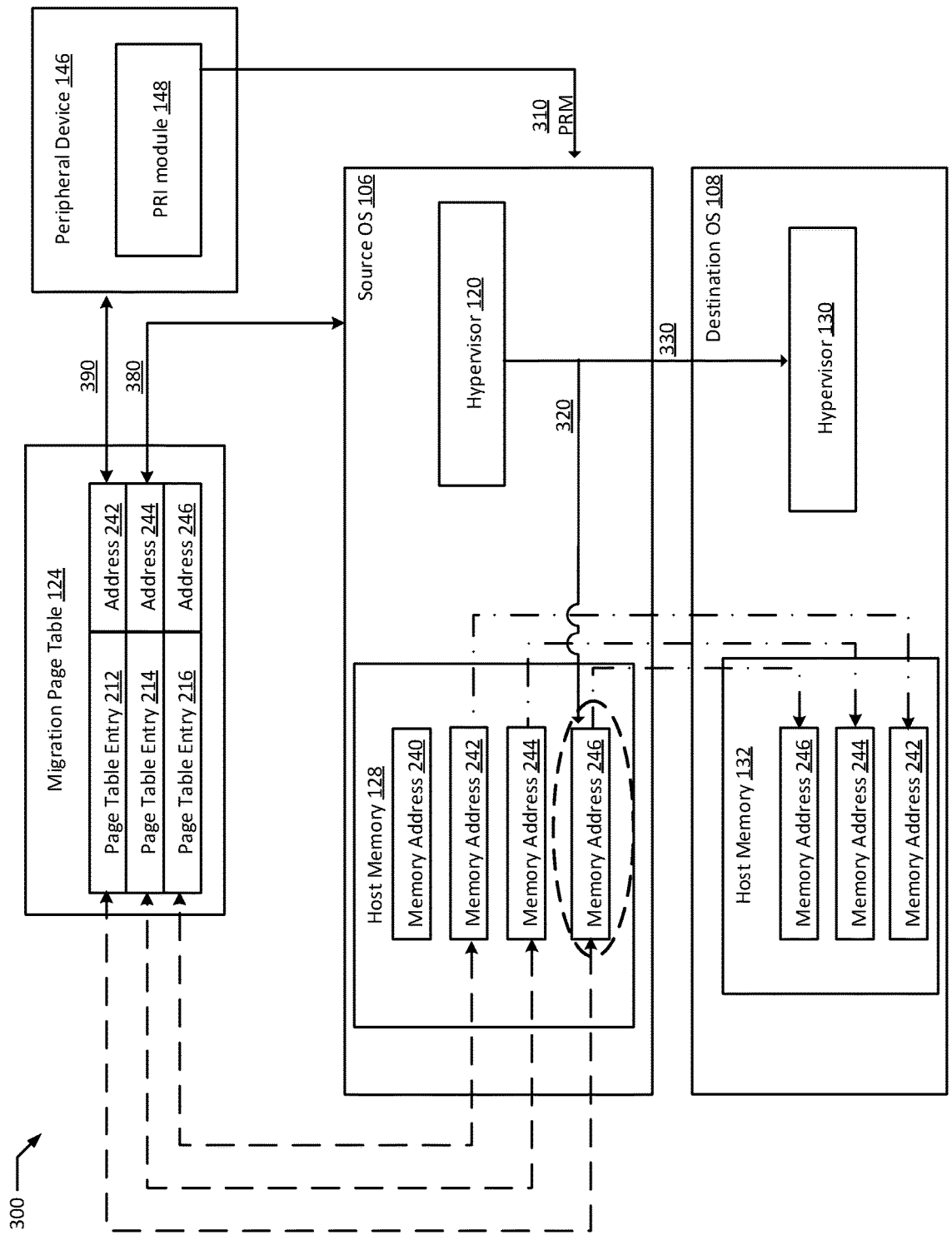
FIG. 3 is a flow block diagram illustrating accessing a page inside of a migration memory range in a PRI overhead reduction system according to an example of the present disclosure.

FIG. 2 is a flow block diagram illustrating a method 200 of accessing a page outside of a migration memory range and FIG. 3 is a flow block diagram illustrating a method 300 of accessing a page outside of a migration memory range according to an example of the present disclosure. The methods 200, 300 are implemented in a PRI overhead reduction system, for example, the computing system 100 of FIG. 1.

The methods 200, 300 include a PRI module 148 on a peripheral device 146 attempting to access a memory page associated with a memory address of physical memory of the source OS 106. The attempt to access occurs during a migration of a plurality of memory addresses 242, 244, 246 from the source OS 106 to the destination OS 108. In both instances, the PRI module 148 checks the migration page table 124 generated by the source OS 106 to determine if each page to be accessed is within the range of memory pages being migrated to the destination OS 108. In an example, the PRI module 148 is communicatively coupled to CPU 142 and/or another component within node 110.

Referring to FIG. 2, the source OS 106 is completing a live migration of a range of memory addresses (e.g., memory pages) 242, 244, 246. The source OS 106 generates the migration page table 124 that comprises page table entries 212, 214, 216 mapped to each address 242, 244, 246 of physical memory of source OS 106. In some embodiments, the page table entries may also comprise Page Frame Numbers (PFN) (e.g., address of memory allocated to an application in the application space) to each address 242, 244, 246 (e.g., address of physical memory of source OS 106) or map to PFNs. In an example, the migration page table 124 just includes the address of physical memory 128 of host OS 106. In another example the migration page table 124 further comprises protection identifiers that indicate the access status of a page corresponding to the page entry 212, 214, 216 of the migration page table 124. For example, a protection identifier may be used to define that a given page is writable (or read-write), write-protected (or read-only), executable (or executable and readable), executable only, etc.

The source OS 106 may transmit 280 the migration page table 124 to a location on the source OS 106, the node 110, to the peripheral device 146, or a similar location where the PRI module 148 can access 290 the migration page table 124. The PRI module 148 checks 290 the migration page table 124 before accessing the page at memory address 240. The page at memory address 240 may be a plurality of memory addresses accessed by a component of the node 110, associated with an application running on a VM 122, 132, and/or similar application or component.

The PRI module 148 identifies that the memory address 240 to be accessed is not within the range of memory addresses (e.g., memory pages) 242, 244, 246 in the migration page table 124 and bypasses PRI and accesses the memory address 240.

Referring to FIG. 3, the source OS 106 is completing a live migration of a range of memory addresses (e.g., memory pages) 242, 244, 246. The source OS 106 generates the migration page table 124 that comprises page table entries 212, 214, 216 mapped to each address 242, 244, 246 of physical memory of source OS 106. In some embodiments, the page table entries may also comprise PFNs (e.g., address of memory allocated to an application in the application space) to each address 242, 244, 246 (e.g., address of physical memory of source OS 106) or map to PFNs. In an example, the migration page table 124 just includes the address of physical memory 128 of host OS 106. In another example the migration page table 124 further comprises protection identifiers that indicate the access status of a page corresponding to the page entry 212, 214, 216 of the migration page table 124. For example, a protection identifier may be used to define that a given page is writable (or read-write), write-protected (or read-only), executable (or executable and readable), executable only, etc.

The source OS 106 may transmit 380 the migration page table 124 to a location on the source OS 106, the node 110, to the peripheral device 146, or a similar location where the PRI module 148 can access 290 the migration page table 124. The PRI module 148 checks 390 the migration page table 124 before accessing the page at memory address 246. The page at memory address 246 may be a plurality of memory addresses accessed by a component of the node 110, associated with an application running on a VM 122, 132, and/or similar application or component.

The PRI module 148 identifies that the memory address 246 to be accessed is within the range of memory addresses (e.g., memory pages) 242, 244, 246 in the migration page table 124. The PRI module 148 transmits a PRM 310 to the source OS 106. The PRI module may not have a NW flag set in the PRM 310 transmitted to the hypervisor 120 or component of the source OS 106. The source OS 106 identifies 320 that the data in memory address 246 accessed by the peripheral device 146 is writable access, and the source host re-copies 330 the accessed data in memory address 246 to the destination OS 108.

The PRI module 148 may send a NW flag to the hypervisor 120 or component of the source OS 106 if the peripheral device 146 is requiring read only access. The source OS 106 identifies that the data in the memory accessed by the peripheral device 146 is read only and does not need to be re-copied to the destination OS 108. In an example, if the PRI module 148 identifies that the memory address 246 is for read only access, the PRI module bypasses the PRM 310 and accesses the data in memory address 246.

Figure 4:
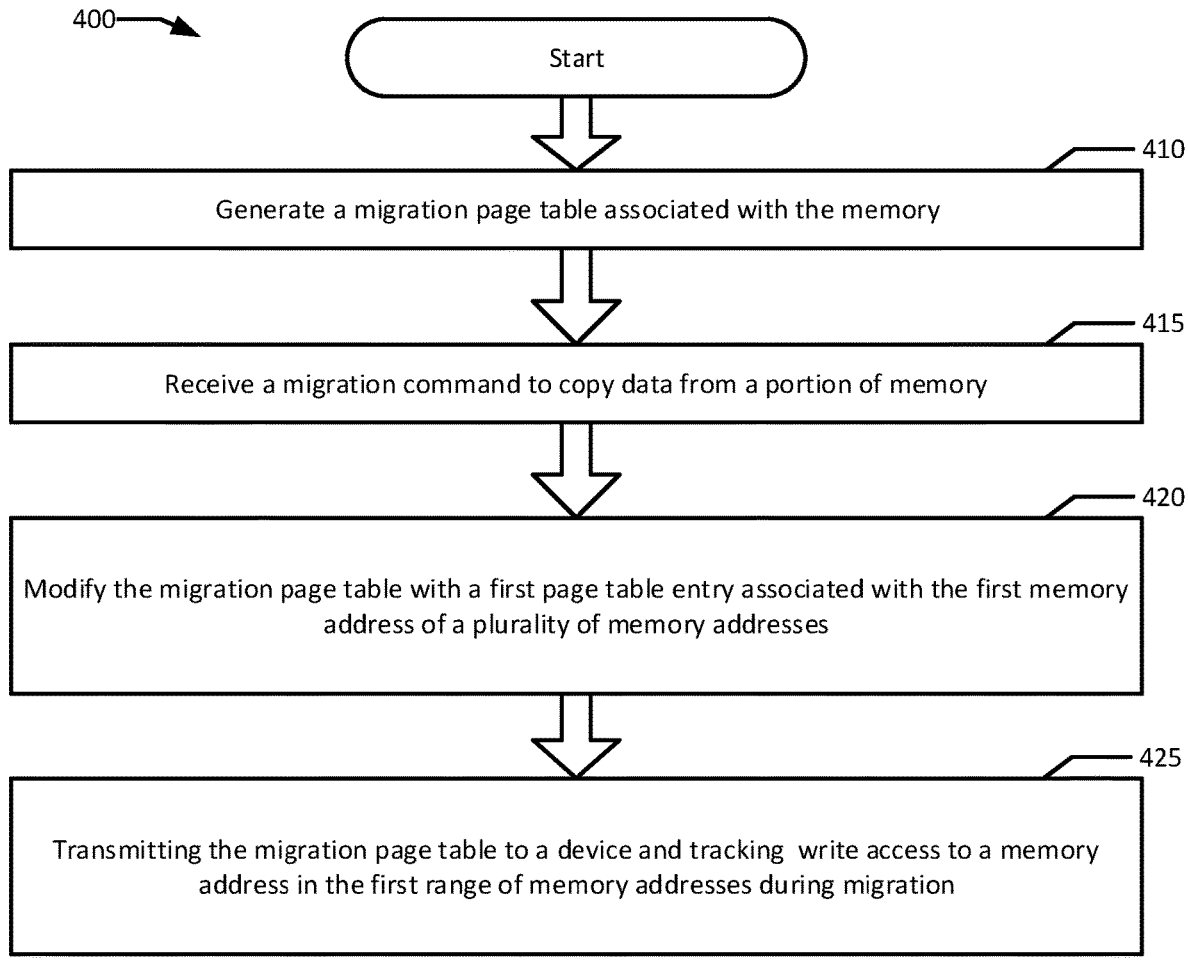
FIG. 4 is a flowchart illustrating an example of a PRI overhead reduction for virtual machine migration according to an example of the present disclosure.

FIG. 4 illustrates a flowchart illustrating an example method 400 for a PRI overhead reduction for virtual machine migration according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example method 400 includes generating a migration page table associated with memory (block 410). For example, a hypervisor 120 may generate a migration page table 124. In an example, the source OS 106 or similar application on the source OS 106 may generate the migration page table 124. The method also includes receiving a migration command to copy date from a portion of memory (block 415). For example, the hypervisor 120 of the source OS 106 may receive a command to copy at least a portion of host memory 128 to the host memory 132 on the destination OS 108. In an example, the hypervisor 120 of the source OS 106 communicates with the hypervisor 130 of the destination OS 108 to facilitate the live migration.

The method also includes modifying the migration page table with a first page table entry associated with the first memory address of a plurality of memory addresses (block 420). For example, the hypervisor 120 may modify the migration page table 124 to include a plurality of page table entries 212, 214, 216 mapped to a plurality of memory addresses 242, 244, 246 being migrated. The method also includes transmitting the migration page table to a device and tracking write access to a memory address in the first range of memory addresses during migration (block 425). For example, the source OS 106 may transmit the migration page table 124 to a peripheral device 146 or PRI module 148 in a device that will accesses a page in the host memory 128 on the source OS 106.

Figure 5:
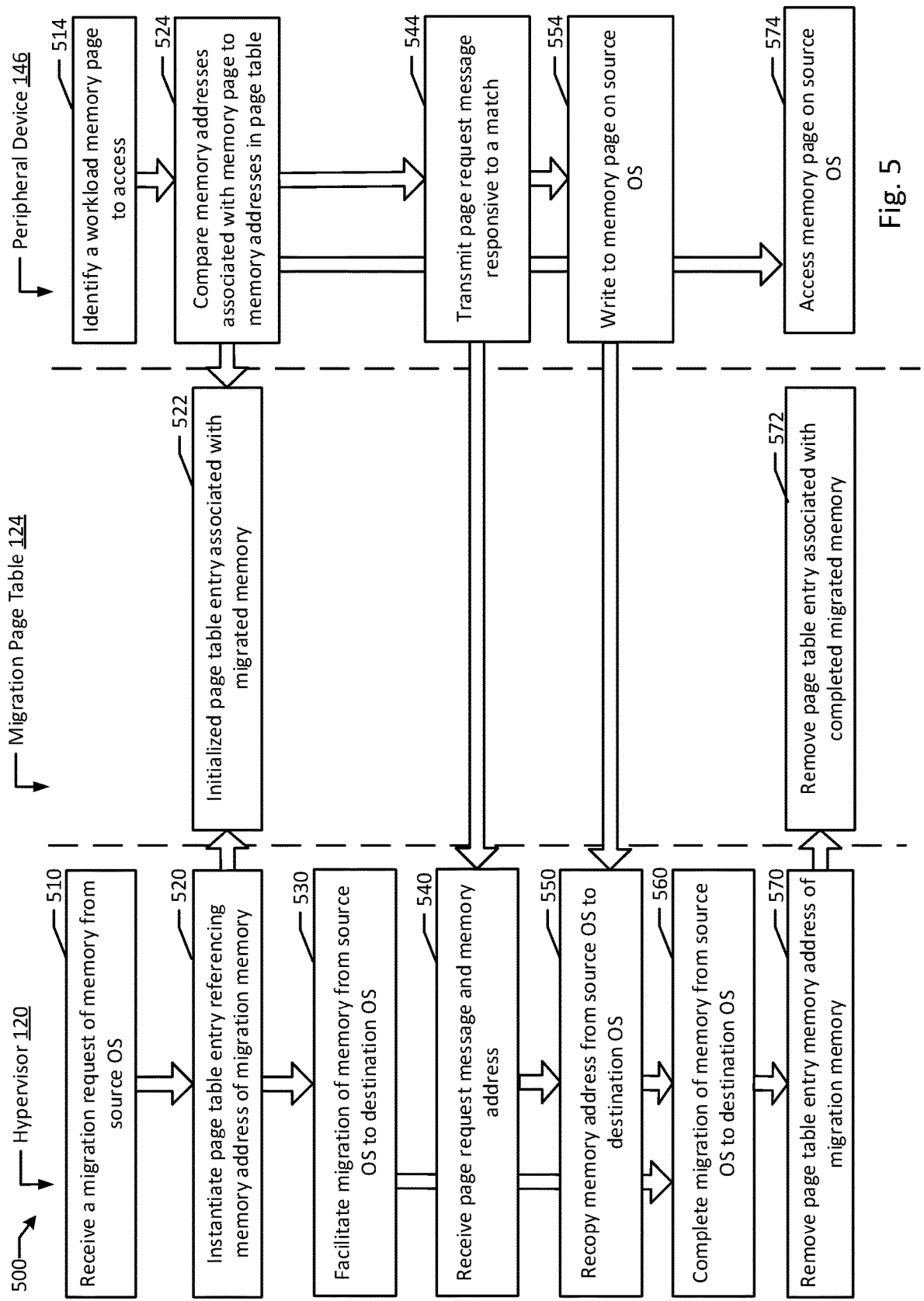
FIG. 5 is a flow diagram illustrating an example of PRI overhead reduction for virtual machine migration according to an example of the present disclosure.

FIG. 5 depicts a flow depicts a flow diagram illustrating an example method 500 for PRI overhead reduction for virtual machine migration according to an example embodiment of the present disclosure. Although the example method 500 is described with reference to the flow diagram illustrated in FIG. 5, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both.

In the illustrated example, a hypervisor 120 receives a migration request to migrate host memory of a source OS to a destination OS (block 510). In an example, the migration request includes moving a running VM or application between the source OS and destination OS without disconnecting the client or application. A page table entry referencing the memory addresses of the host memory to be migrated is instantiated (block 520) and the migration page table 124 is initialized (e.g., generated) with a page table entry associated with each memory page being migrated from the source OS to the destination OS (block 522). In an example, the migration page table 124 may be transmitted to the peripheral device 146.

In an example, the memory pages to be transferred are a range of memory address in the host memory that may be sequential or non-sequential memory addresses. In an example, the page table entry comprises a plurality of page table entries and the first range of memory addresses comprises a plurality of memory addresses. Each page table entry in plurality of page table entries is associated with a memory address in the plurality of memory addresses being copied from the source host to the destination host. The hypervisor 120 facilitates the migration of host memory from the source OS to the destination OS (block 530) and if no PRM are received by devices accesses the migration memory, the migration of memory from the source OS and destination OS is completed (block 560).

During the live migration, a peripheral device 146 identifies a workload memory page or memory pages to access on the source OS (block 514). In an example, an application on the VM is accessed by a guest user such that such that when the guest application uses or accesses a memory page of virtual machine memory, the guest application is actually using or accessing host memory 128 by way of the peripheral device 146. The peripheral device 146, or a PRI module, compares the memory addresses associated with the to-be accessed memory page(s) and compares the memory addresses to the memory addressed in the migration page table 124 (block 524). If the memory addresses associated with the to-be accessed memory page(s) are not within the range of memory addresses in the migration page table 124, the peripheral device 146 accesses the memory page(s) (block 574).

If the memory addresses associated with the to-be accessed memory page(s) is within the range of memory addresses in the migration page table 124, the peripheral device 146 transmits a PRM to the hypervisor 120 responsive to the match/within range memory addresses (block 544). The hypervisor 120 receives the PRM from a PRI module on the peripheral device 146 (block 540). The peripheral device 146 has write access to the memory page(s) and access the memory pages (block 554). The hypervisor 120 re-copies data from the memory page(s) accessed by the peripheral device 146 (block 550). In an example, the hypervisor 120 re-copies the data from the memory page(s) accessed by the peripheral device 146 after the peripheral device 146 stops access. In an example, the hypervisor 120 re-copies the data from the memory page(s) accessed by the peripheral device 146 throughout the live migration process.

After the migration of memory from the source OS and destination OS is completed (block 560), the hypervisor 120 removes the page table entries associated with the memory addresses that were migrated (block 570). The migration page table 124 is updated such that the page table entries associated with the memory addresses that were migrated are removed (block 572). In an example, the updated migration page table 124 may be transmitted to the peripheral device 146. In an example, the migration page table 124 is empty when no memory migration is occurring.

Figure 6:
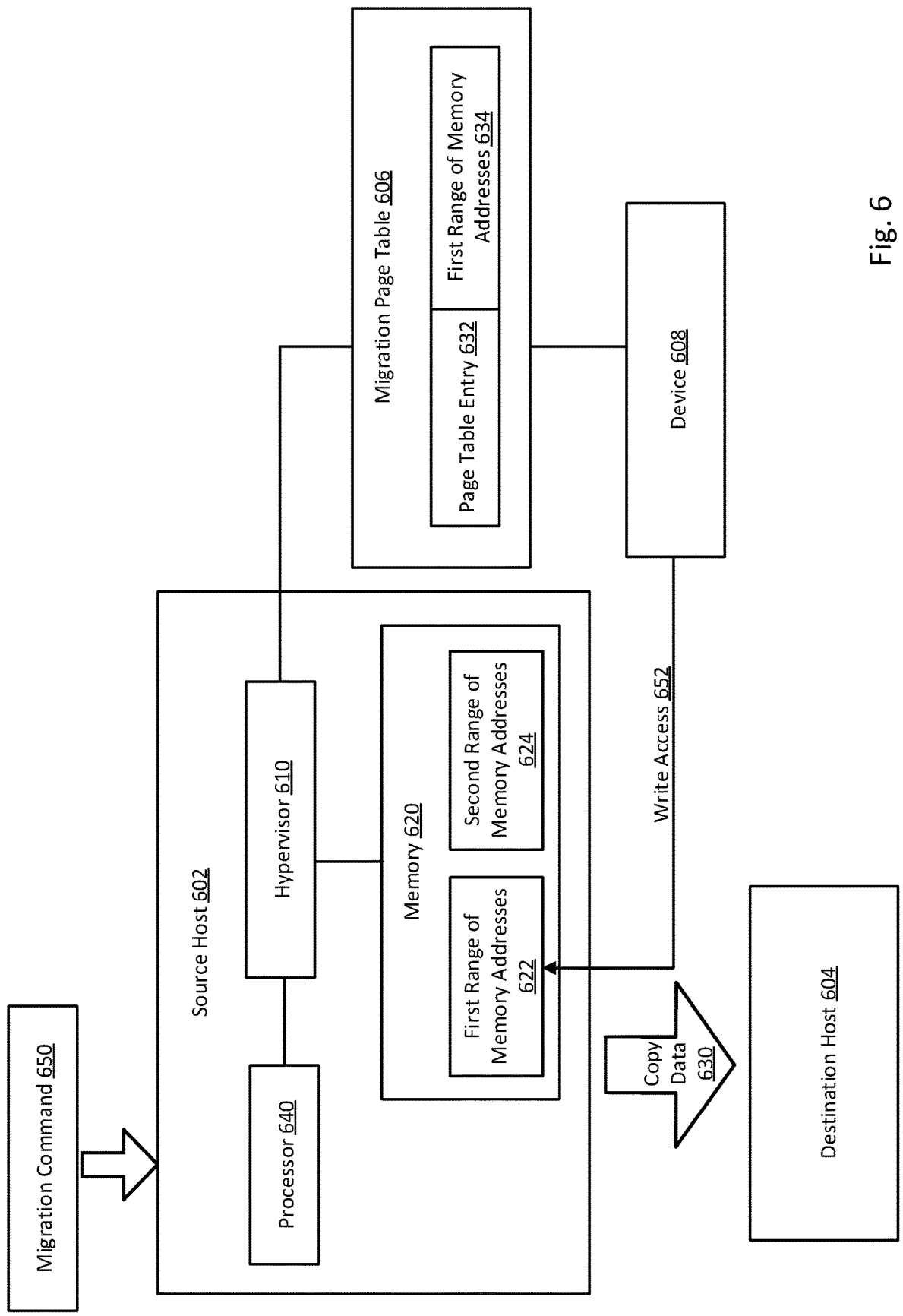
FIG. 6 is a block diagram of an example PRI overhead reduction for virtual machines system according to an example of the present disclosure.

FIG. 6 is a block diagram of an example a PRI overhead reduction for virtual machine migration system 600 according to an example embodiment of the present disclosure. The system 600 includes a hypervisor 610, a memory 620, and a migration page table 606. The hypervisor 610 is configured to execute on a processor 640 to generate a migration page table 606 associated with the memory 620. The hypervisor 610 is also configured to receive a migration command 650 to copy data 630 from a portion of the memory 620 that includes a plurality of memory addresses on a source host 602 to a destination host 604. In an example, a first range of memory addresses 622 includes the data copied 630 from the portion of the memory 620, and a second range of memory addresses 624 includes data not copied. The hypervisor 610 is also configured to modify the migration page table 606 to include a page table entry 632 associated with the first range of memory addresses 634 being migrated from the source host 602 to the destination host 604. In an example, write access 652 to a memory address in the first range of memory addresses 622 by a device 608 during the migration command 650 is tracked.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

The invention is claimed as follows:

1. A system comprising:
    a memory comprising a plurality of memory addresses on a source host; and
    a hypervisor configured to execute on one or more processors to:
        generate a migration page table associated with the memory;
        receive a migration command to copy data from a portion of the memory to a destination host, a first range of memory addresses comprising the data copied from the portion of the memory, and a second range of memory addresses comprising data not copied; and
        modify the migration page table to include a page table entry associated with the first range of memory addresses being migrated from the source host to the destination host, wherein write access to a memory address in the first range of memory addresses by a device during migration is tracked.

2. The system of claim 1, wherein the hypervisor is further configured to execute to transmit the migration page table, the migration page table referenced to identify if a workload memory address is within the first range of memory addresses being migrated from the source host to the destination host.

3. The system of claim 2, wherein the migration page table is transmitted to the device, the device accessing memory on the source host, wherein the device references the migration page table to identify if the workload memory address is within the first range of memory addresses being migrated from the source host to the destination host.

4. The system of claim 3, wherein the hypervisor is further configured to execute to:
    receive a page request message from the device responsive to the workload memory address being within the first range of memory addresses, the page request message associated with the workload memory address in the first range of memory addresses and read/write access to data from the workload memory address in the first range of memory addresses; and
    transmit, after read/write access is completed, the data from the workload memory address in the first range of memory addresses from the source host to the destination host.

5. The system of claim 1, wherein the hypervisor is further configured to execute to:
    receive a page request message, the page request message associated with a first memory address in the first range of memory addresses and read/write access to data from the first memory address in the first range of memory addresses; and
    flag the first memory address to be subsequently copied to the destination host after read/write access is completed.

6. The system of claim 1, wherein the hypervisor is further configured to execute to:
    receive a migration complete command associated with completion of copying data from the portion of the memory to the destination host; and
    delete the page table entry associated with the first range of memory addresses.

7. The system of claim 6, wherein the hypervisor is further configured to execute to transmit an updated migration page table, the updated migration page table replacing the migration page table.

8. The system of claim 1, wherein the first range of memory addresses being migrated from the source host to the destination host is a plurality of sequential memory addresses.

9. The system of claim 1, wherein the first range of memory addresses being migrated from the source host to the destination are a plurality of memory addresses with at least one memory address in the plurality of memory addresses being non-sequential with another memory address in the plurality of memory addresses.

10. The system of claim 1, wherein the migration page table comprises a plurality of page table entries, wherein the first range of memory addresses comprises a plurality of memory addresses, and wherein each page table entry in the plurality of page table entries is associated with a memory address in the plurality of memory addresses being copied from the source host to the destination host.

11. The system of claim 1, wherein the migration page table is subsequently accessed by the device accessing a workload memory location, wherein the workload memory location is compared to the first range of memory addresses in the page table entry to output a result.

12. A method comprising:
    generating, by a hypervisor, a migration page table associated with a memory, memory comprising a plurality of memory addresses on a source host;
    receiving, by the hypervisor, a migration command to copy data from a portion of the memory to a destination host, a first range of memory addresses comprising the data copied from the portion of the memory, and a second range of memory addresses comprising data not copied; and
    modifying, by the hypervisor, the migration page table to include a page table entry associated with the first range of memory addresses being migrated from the source host to the destination host, wherein write access to a memory address in the first range of memory addresses by a device during migration is tracked.

13. The method of claim 12, further comprising, transmitting, by the hypervisor, the migration page table, the migration page table referenced to identify if a workload memory address is within the first range of memory addresses being migrated from the source host to the destination host.

14. The method of claim 13, wherein the migration page table is transmitted to the device, the device accessing memory on the source host, wherein the device references the migration page table to identify if the workload memory address is within the first range of memory addresses being migrated from the source host to the destination host.

15. The method of claim 14, further comprising:
receiving, by the hypervisor, a page request message from the device, the page request message responsive to the workload memory address being within the first range of memory addresses, the page request message associated with the workload memory address in the first range of memory addresses and read/write access to data from the workload memory address in the first range of memory addresses; and
transmitting, by the hypervisor, after read/write access is completed, the data from the workload memory address in the first range of memory addresses from the source host to the destination host.

16. The method of claim 12, further comprising:
receiving, by the hypervisor, a page request message, the page request message associated with a first memory address in the first range of memory addresses and read/write access to data from the first memory address in the first range of memory addresses; and
flagging, by the hypervisor, the first memory address to be subsequently copied to the destination host after read/write access is completed.

17. The method of claim 12, wherein the first range of memory addresses being migrated from the source host to the destination host is a plurality of sequential memory addresses.

18. The method of claim 12, wherein the first range of memory addresses being migrated from the source host to the destination are a plurality of memory addresses with at least one memory address in the plurality of memory addresses being non-sequential with another memory address in the plurality of memory addresses.

19. The method of claim 12, wherein the migration page table comprises a plurality of page table entries, wherein the first range of memory addresses comprises a plurality of memory addresses, and wherein each page table entry in the plurality of page table entries is associated with a memory address in the plurality of memory addresses being copied from the source host to the destination host.

20. A non-transitory machine-readable medium storing code, which when executed by a processor is configured to:
generate a migration page table associated with memory, the memory comprising a plurality of memory addresses on a source host;
receive a migration command to copy data from a portion of the memory to a destination host, a first range of memory addresses comprising the data copied from the portion of the memory, and a second range of memory addresses comprising data not copied; and
modify the migration page table to include a page table entry associated with the first range of memory addresses being migrated from the source host to the destination host, wherein write access to a memory address in the first range of memory addresses by a device during migration is tracked.

* * * * *